(12) United States Patent
Ba et al.

(10) Patent No.: US 10,896,378 B2
(45) Date of Patent: Jan. 19, 2021

(54) FAST DETECTION OF ENERGY CONSUMPTION ANOMALIES IN BUILDINGS

(71) Applicant: INTERNATIONAL BUSINESS MACHINES CORPORATION, Armonk, NY (US)

(72) Inventors: Amadou Ba, Dublin (IE); Joern Ploennigs, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 15/859,963

(22) Filed: Jan. 2, 2018

(65) Prior Publication Data
US 2019/0205774 A1  Jul. 4, 2019

(51) Int. Cl.
*G06N 5/04* (2006.01)
*G05B 15/02* (2006.01)

(52) U.S. Cl.
CPC ............... *G06N 5/04* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 2014/0358839 A1* | 12/2014 | Dhurandhar | G06Q 50/06 706/48 |
| 2016/0005015 A1 | 1/2016 | Curtis | |
| 2016/0035052 A1 | 2/2016 | Tran | |
| 2016/0154389 A1 | 6/2016 | Drees et al. | |
| 2017/0160328 A1* | 6/2017 | Pal | G01R 31/088 |

* cited by examiner

*Primary Examiner* — Sean Shechtman
(74) *Attorney, Agent, or Firm* — Griffiths & Seaton PLLC (57) ABSTRACT

Embodiments for detection of energy consumption anomalies in one or more energy consumption systems in a cloud computing environment by a processor. Energy consumption may be predicted for one or more facilities according to one or more energy consumption measurements, weather data, and one or more characteristics of the one or more facilities, or a combination thereof. An onset of an energy consumption anomaly may be detected according to the prediction.

18 Claims, 8 Drawing Sheets

FAST DETECTION OF ENERGY CONSUMPTION ANOMALIES IN BUILDINGS

BACKGROUND OF THE INVENTION

Field of the Invention

The present invention relates in general to computing systems, and more particularly to, various embodiments for cognitive energy consumption anomaly detection in a building associated with a cloud computing environment using a computing processor.

Description of the Related Art

In today's society, various advances in mechanical systems, coupled with advances in computing technology have made possible a wide variety of attendant benefits, such as increasing the efficiency of fluid transfer pumping systems. As computers proliferate throughout aspects of society, additional opportunities continue to present themselves for leveraging technology in energy management systems for improving efficiency of power and energy consumption.

SUMMARY OF THE INVENTION

Various embodiments for cognitive detection of energy consumption anomalies in one or more buildings (e.g., energy consumption systems in a building) that may be associated with a cloud computing environment by a processor are provided. In one embodiment, by way of example only, a method/system for fast detection of abnormal energy consumption of energy consumption systems of a building using an array of Internet of Things (IoT) sensors in a computing environment is provided. Energy consumption may be predicted for one or more facilities according to one or more energy consumption measurements, weather data, and one or more characteristics of the one or more facilities, or a combination thereof. An onset of an energy consumption anomaly may be detected according to the prediction.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Energy consumption, monitoring, and management are crucial components of infrastructures such as, for example, buildings. In modern society, buildings provide very important space for various activities such as, for example, business, educational, governmental, organizational, and even activities of daily living (e.g., an apartment complex). For example, most business activities happen in the buildings, such as business strategy planning, business negotiation, customer visit, software development, hardware design, etc. Providing a comfortable and inviting environment for occupants of the building is instrumental to improve their working or living efficiency and productivity, which however, necessarily requires provision of better illumination, air conditioning and ventilation. As a result, more energy is consumed.

Many buildings have meters and sub-meters that measure energy consumption in various zones of a building and for various equipment, e.g., chillers, boilers, pumps, air handling unit (AHU), lighting, plug load, etc. Such meters and sub-meters can provide high resolution meter data (e.g., by 15-minutes and hourly, etc.) and a computerized system such as a Building Management System (BMS) stores such meter data, making them readily available.

However, currently there is no use of online analytics with adaptive tuning parameters to monitor energy consumption in buildings. As such, at least two major challenges arise. First, there is no efficient adaptation to non-stationarities, which can be symptomatic of abnormal energy consumption. Second, batch processing (of a power signal) requires having all the data before starting the processing which delays the detection of abnormal energy consumption. Accordingly, a need exits for online monitoring (e.g., an energy management system in a computing environment) of energy consumption in one or more buildings. The energy management system may provide 1) fast and efficient decision making upon abnormal energy consumption detection, 2) fast and efficient implementation of corrective measures, 3) efficient and less expensive monitoring with fast detection, and/or 4) a recorder system to collect, record, and/or send the results of monitoring to the reading devices only upon abnormal energy consumption detection.

In one aspect, by way of example only, the present invention provides for fast detection of abnormal energy consumption of energy consumption systems of a building using an array of Internet of Things (IoT) sensors associated with an IoT computing environment. Energy consumption may be predicted for one or more facilities according to one or more energy consumption measurements, weather data, and one or more characteristics of the one or more facilities, or a combination thereof. An onset of an energy consumption anomaly may be detected according to the prediction.

In an additional aspect, the present invention provides for an energy management system. The energy management system may include one or more recorder devices (e.g., "smart meters") for recording energy, buildings specificity, weather for online predictions, and fast detection of abnormal energy consumption. In one aspect, buildings specificity may refer to commercial, residential, corporate, administrative buildings, or other type of buildings where each building may have an energy consumption pattern (e.g., an energy consumption signature unique to the particular building). Furthermore, in each of the buildings, the energy consumption pattern may depend on a number of occupants, the number and type of systems (e.g., heating, ventilation, and air conditioning (HVAC), computing systems, or other energy consuming systems that may require the use of energy) present in the buildings, and the like. Also, the nature of the energy consumption in each building may differ depending on the time such as, for example, the day, the week, the month, and/or weekdays to weekend, and from morning to evening.

A communication system may be provided and connected to the recording devices associated with the energy management system. The energy management system may analyze, interpret, and use the recorded information and display 1) recorded measurements (e.g., energy measurements, building data, weather data, etc.), 2) predicted energy consumption, and/or 3) monitored results of the consumed energy. A prediction operation for predicting energy consumption may be performed with any learning operations or machine learning operations for one or more predictive models (e.g., kernel recursive least squares, generalized additive model "GAM") with the specificity of having adaptive tuning parameters (e.g., use a gradient operation to cause the tuning parameters to become adaptive). The monitoring is performed with any change-point detection. It should be noted that the present invention may operate with both fixed and/or adaptive tuning parameters. To allow fast detection of anomalies, the present invention may exploit adaptive tuning parameters.

Also, the tuning parameters may be the parameters that control the flexibility of an operation or algorithm. The flexibility relating to the operation or algorithm may be fluctuating (e.g., high fluctuating) or smooth. The trade-off between high flexibility and smoothness is fixed by the tuning parameters. As an example, a tuning parameter may be the size of data (e.g., a window size) upon which the parameters of a predictive model are computed. Therefore, the parameters of the predictive model may be changed depending on the size of the window. In terms of anomaly detection, a large window (e.g., a larger window of data) may provide reliable, but delayed detection of anomalies. Conversely, a small window (e.g., a smaller window of data compared to the larger window of data) may yield fast detection at the expense of several potential false alarms due to an increased number of fluctuations. To arrive at a trade-off, the present invention provides the use of adaptive tuning parameters for both reliable and fast detection.

In one aspect, the present invention pertains to any closed-loop thermal energy system (heating and cooling). The benefits and advantages of the system may include eliminating/reducing the requirement to shut down a system. The present invention enables the system to maintain operation, without a system shutdown and enables sample data from temperature flows of the fluid to be detected by an IoT sensor secured on one or more positions of the closed-loop thermal energy system.

In one aspect, the present invention provides for a dual system of recorders and an energy management system, for detecting the onset of abnormal energy consumption in buildings. One or more recorder devices (e.g., IoT sensor devices or "smart meters") may record energy measurements, weather and building characteristics, and compute online residuals and detect early onset of abnormal events when detected. In case of abnormal event detection, the recorder (smart meters) may notify the energy management system (e.g., a computer, smartphones, tablets, IoT devices, and the like) about the presence of energy consumption anomalies. To allow an early detection of abnormal energy consumption, one or more tuning parameters may be adaptive for the prediction operation so as to capture at the earliest stage or occurrence of the presence of energy anomalies in buildings, and particularly energy consumption anomalies. In order to increase efficiency and decrease deployment costs in the context of various buildings, the recorder devices may integrate prediction and anomaly detection capabilities and directly output the energy management results, which may be improved by the adaptive tuning parameters, to one or more computing devices. In one aspect, the online residuals may be the residuals that are computed in real-time. The residuals are the difference between the actual energy consumption and the predicted energy consumption. When the actual energy consumption and the predicted energy consumption are equal to zero, there is no anomaly. When the actual energy consumption and the predicted energy consumption are different (e.g., none zero), an anomaly might be present. In the cases where the residuals are different from zero, the actual energy consumption and the predicted energy consumption may be transferred to a change-point method, which will confirm or infirm the presence of an anomaly.

In one aspect, the present invention may detect early onset of abnormal energy consumption for a building by using predicted energy consumption. More specifically, the present invention may predict power consumption for the building based on building parameters, weather conditions, and other contextual data relating to energy usage. The predicted power consumption may be compared with a standardized power consumption threshold of one or more buildings for detecting onset of abnormal power consumption. A recording system (e.g., reading systems such as "smart meters") may be activated for capturing power consumption data so as to identify an exact location for anomalies and alerting a user. One or more tuning parameters of prediction models may be dynamically changed by considering the building parameters, the weather conditions, energy consumption measurements, or a combination thereof.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, tablets, and the like).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
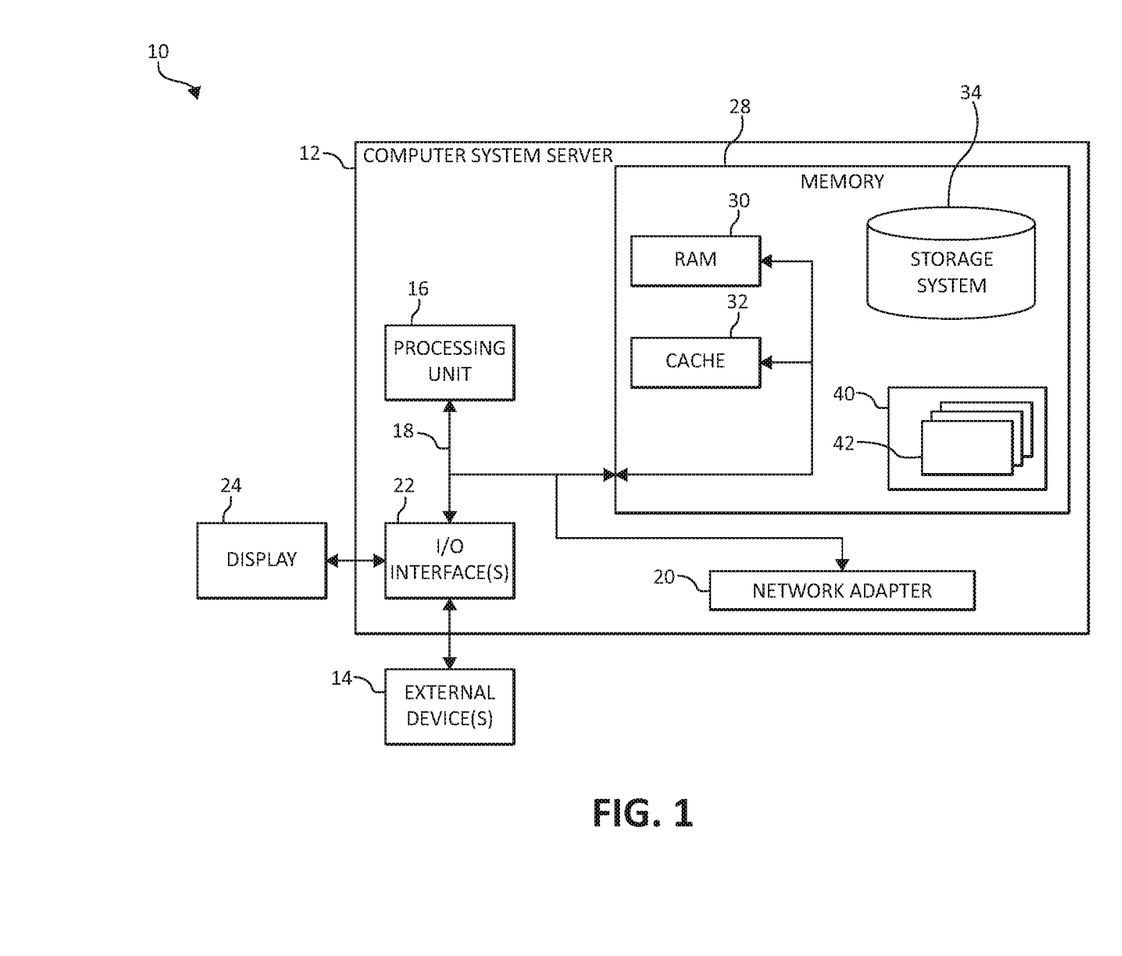
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
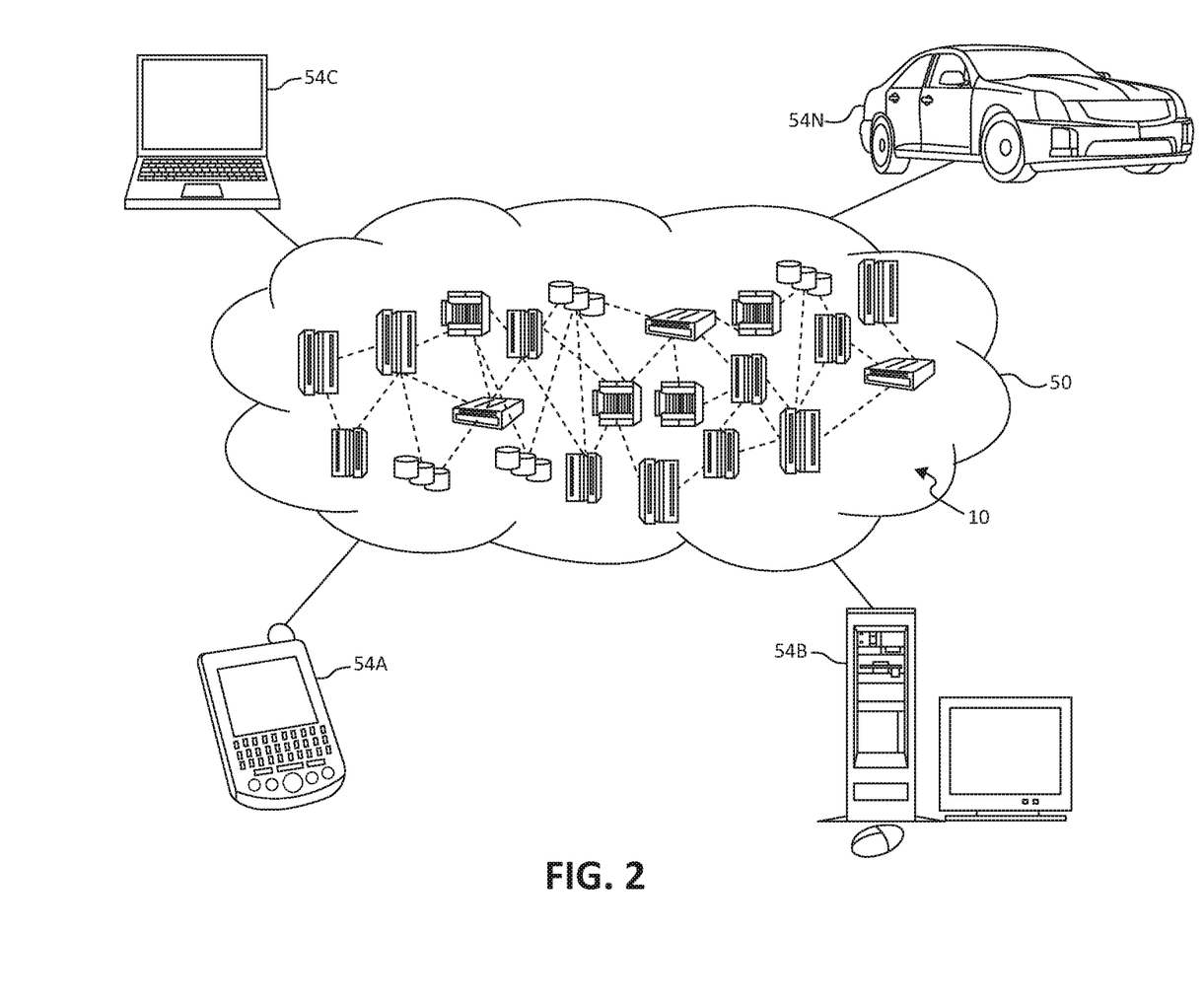
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
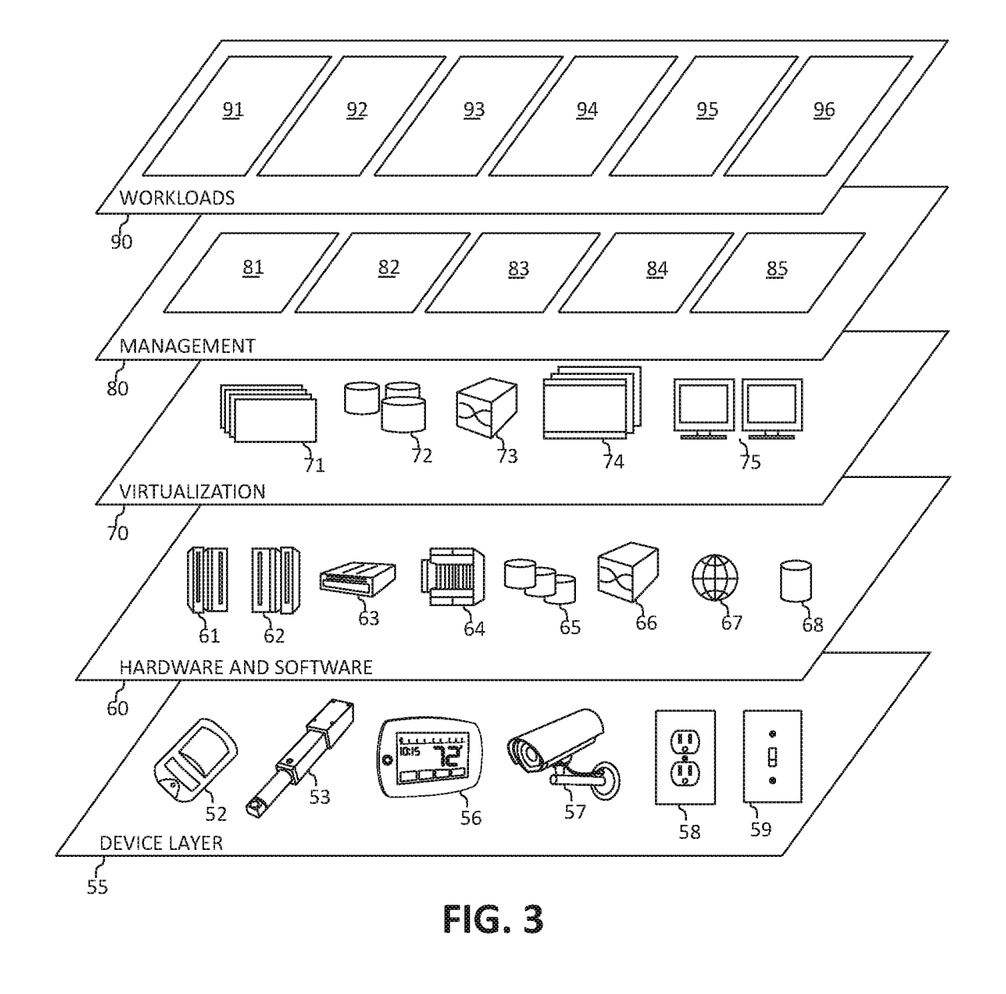
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for cognitive detection of energy consumption. In addition, workloads and functions 96 for cognitive detection of energy consumption may include such operations as data analysis (including data collection and processing from various environmental sensors), and predictive data analytics functions. One of ordinary skill in the art will appreciate that the workloads and functions 96 for cognitive detection of energy consumption may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
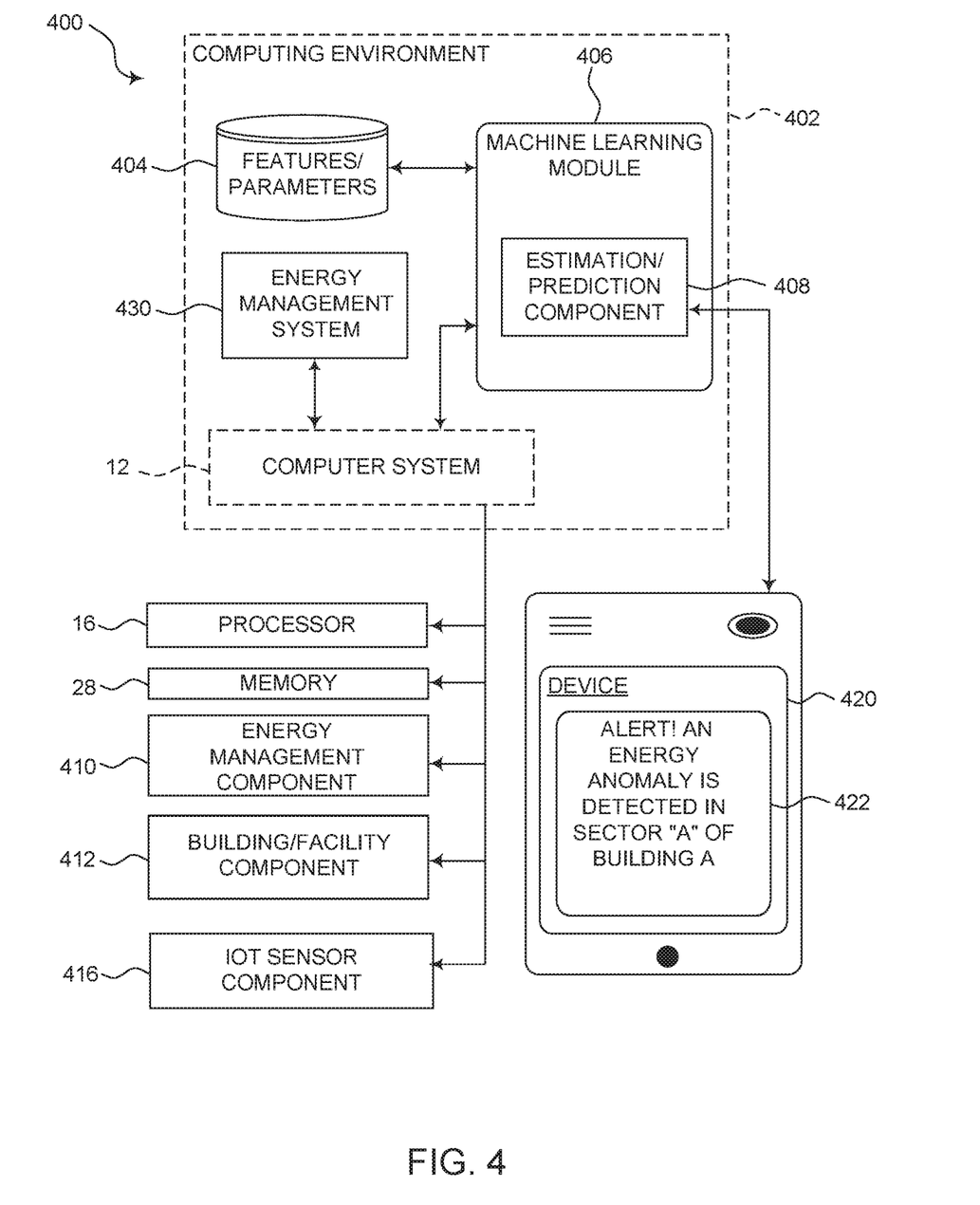
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. FIG. 4 illustrates cognitive energy consumption anomaly detection and training of a machine learning model in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for accurate temporal event predictive modeling in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402 (e.g., included in a heat exchange system/unit), an energy management system 430, and a device 420, such as a desktop computer, laptop computer, tablet, smartphone, and/or another electronic device that may have one or more processors and memory. The device 420, the energy management system 430, and the computing environment 402 may each be associated with and/or in communication with each other, by one or more communication methods, such as a computing network. In one example, the device 420 and/or the energy management system 430 may be controlled by an owner, customer, or technician/administrator associated with the computing environment 402. In another example, the device 420 and/or the energy management system 430 may be completely independent from the owner, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a features and/or parameters 404 (e.g., "tuning parameters" of a predictive model) that is associated with a machine learning module 406, and the energy management system 430. The features and/or parameters database 404 may also include energy usage profiles, building profiles (e.g., building characteristics or parameters) for each energy management system 430 (that may be included in one or more buildings) and/or IoT sensor devices (e.g., "smart readers") associated with an IoT sensor component 416. It should be noted that one or more IoT sensor devices may be represented as the IoT sensor component 416 may be coupled to the energy management system 430. In one aspect, the IoT sensor component 416 may be a smart meter that may record consumption of electric energy. The smart meter may record the consumption of electric energy in selected time intervals and communicate that information at various selected periods of time. In an additional aspect, the IoT sensor component 416 may be associated with one or more smart meters for collecting, recording, and measuring energy consumption in one or more buildings.

The features and/or parameters 404 may be a combination of features, tuning parameters, building characteristics, energy consumption data, temperature data, historical data, tested and validated data, or other specified/defined data for testing, monitoring, validating, detecting, learning, analyzing and/or calculating various conditions or diagnostics relating to cognitively detecting energy consumption anomalies in the energy management system 430. That is, different combinations of parameters may be selected and applied to the input data for learning or training one or more machine learning models of the machine learning module 406. The features and/or parameters 404 may define one or more settings of the IoT sensors (e.g., smart meters) associated with the IoT sensor component 416 to enable the collecting, recording, and measuring energy consumption in one or more buildings. The one or more the IoT sensors (e.g., smart meters) associated with the IoT sensor component 416 may be coupled to the energy management system 430 at one or more defined distances from alternative IoT sensors (e.g., smart meters).

The computing environment 402 may also include a computer system 12, as depicted in FIG. 1. The computer system 12 may also include the energy management component 410, a building/facility component 412, and an IoT sensor component 416 each associated with the machine learning module for training and learning one or more machine learning models and also for applying multiple combinations of features, tuning parameters, building characteristics, energy consumption profiles for each building, normalized/standardized energy consumption values, previously estimated energy consumption values, temperature data, or a combination thereof to the machine learning model for cognitive detection of energy consumption anomalies in one or more buildings.

In one aspect, the building/facility component 412 includes data relating to the characteristics, parameters, features, and/or energy consumption information relating to each building or facility in association with the energy management system 430.

In one aspect, the machine learning module 406 may include an estimation/prediction component 408 for cognitively predicting energy consumption for one or more facilities according to one or more energy consumption measurements, weather data, and one or more characteristics of the one or more facilities, or a combination thereof. The machine learning module 406 may collect feedback information from the one or more IoT sensors/smart meters associated with the IoT sensor component 416 to cognitively learn or estimate one or more tuning parameters of one or more prediction models for predicting the energy consumption, and/or dynamically change one or more tuning parameters of one or more prediction models for predicting the energy consumption (in association with the energy management component 410). The machine learning module 406 may use the feedback information to provide cognitive detection of energy consumption and detect an onset of an energy consumption anomaly according to the prediction using the estimation/prediction component 408. The machine learning module 406 may be initialized using feedback information to learn behavior of the energy management system 430 for each particular building.

The energy management component 410 may perform a monitoring operation. The monitoring operation may perform 1) data cleaning, 2) energy consumption forecasting for residual generation, and 3) change point detection. In one aspect, the data cleaning process may detect one or more missing values and outliers and compensate the values and/or outliers by using a median filter or other interpolation operation. In one aspect, an outlier may be any value (datum) that is far distant from the other values (data) of the energy consumption. For example, if for a given building on Monday at 9:00 a.m. the usual energy consumption is 900 kilowatts ("KW"), when for a similar day (Monday) the recorded value at 9:00 a.m. is 90000 KW, then this value is an outlier. Furthermore, if at 9:00 am for the similar day (Monday) the recorded value is 3 KW, this is also an outlier, because it deviates from the usual recording. An exception to this rule may be a defined holiday or vacation days. A missing value may be an existing value that a recorder missed and failed to capture. The missing value may be recognized by a NAN ("Not A Number") signature.

Moreover, detecting an outlier may include detecting the values that fall outside a normal or standardized range of the energy consumption. Detecting missing values may include detecting the NAN or any other pre-specified signature and reflecting missing values. One or more outlier detection operations may be used such as, for example, by setting a threshold value for each day of the week and time of the day and detect values overtaking the thresholds, which may then be considered as outliers. A median filter may be used to replace the missing values and/or outliers by the median values, where the values considered are those corresponding to the similar day, hour, and minutes.

The energy management component 410, in association with the machine learning module 406 and/or the energy management system 430, may predict energy/power consumption for each building based on building parameters, weather conditions, and energy/power consumption of each building so to compare the predicted energy/power consumption with a standardized amount of energy/power consumption of one or more buildings for detecting early onset of abnormal power consumption.

The energy management component 410, in association with the IoT sensor component 416, may enable one or more reading systems (IoT sensors or smart meters) for capturing power consumption data in the one or more buildings so as to identify exact location for energy/power consumption anomalies.

The energy management component 410 may alert a user (e.g., via device 420) of the detected energy/power consumption anomalies. The device 420 may include a graphical user interface (GUI) 422 enabled to display on the device 420 one or more user interface controls for a user to interact with the GUI 422. For example, the GUI 422 may display the detected energy/power consumption anomalies to a user via an interactive graphical user interface (GUI) according to the cognitive detection of energy consumption anomalies in the energy management system. For example, the output to the device may be an alert that indicates or displays audibly and/or visually on the GUI 422 "ALERT! An energy anomaly is detected in sector "A" of building A."

In one aspect, the cognitive detection of energy consumption anomalies in an energy system and estimation/predictive modeling (or machine learning modeling), as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In one aspect, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
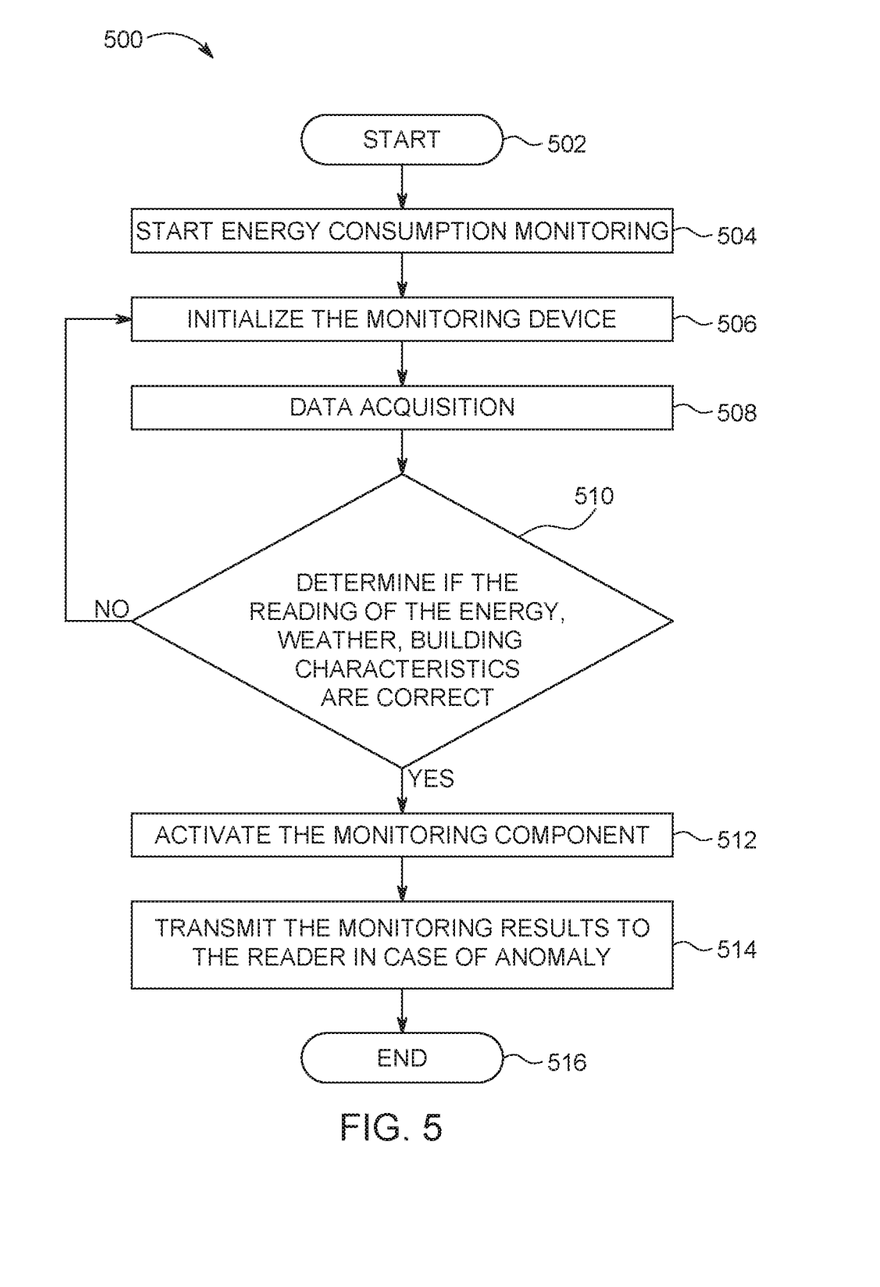
FIG. 5 is a flowchart diagram of an exemplary method for cognitive detection of energy consumption anomalies using one or more Internet of Things (IoT) devices ("smart recorders") operating within a computing network in accordance with aspects of the present invention.

FIG. 5 is a flowchart diagram of an exemplary method for cognitive detection of energy consumption anomalies using one or more Internet of Things (IoT) devices ("smart recorders") operating within a computing network, in which various aspects of the illustrated embodiments may be implemented. The blocks of functionality 500 may also be incorporated into various hardware and software components of FIGS. 1-4. The functionality 500 may be implemented as a method executed as instructions on a machine, where the instructions are included on at least one computer readable medium or one non-transitory machine-readable storage medium.

The functionality 500 may start in block 502. Energy consumption monitoring may be started/commenced (e.g., for one or more buildings), as in block 504. A monitoring device may be initialized, as in block 506. That is, the monitoring component may be a recorder device (e.g., a "smart" recorder or IoT sensor device) that may collect and/or record energy consumption measurements, perform one or more predictions, detect energy consumption anomalies, and/or energy consumptions. Various types of data may be collected and acquired, as in block 508. The various types of data may include energy data, building data (e.g., characteristics, parameters, design features, and the like), weather data, and other contextual data relating to the energy consumption in the buildings.

A determination operation may be performed to determine whether a reading of the energy consumption, weather, and/or building characteristics are correct, as in block 510. That is, the "reading" of the energy consumption is correct if the reading is not an outlier or a missing value, as described above. From block 510, if the reading of the energy consumption, weather, and/or building characteristics are not correct, the functionality 500 may return to step 506. Alternatively, if the reading of the energy consumption, weather, and/or building characteristics are correct, a monitoring component may be activated, as in block 512. Monitoring results may be transmitted to one or more computing devices of a user (e.g., via a graphical user interface "GUI") upon detection of an energy consumption anomaly, as in block 514. The functionality 500 may end in block 516.

Figure 6:
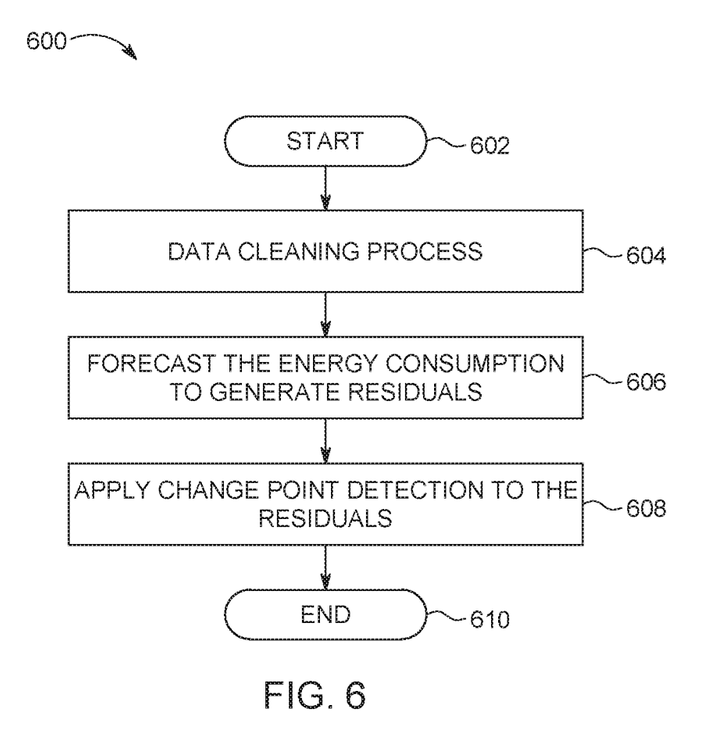
FIG. 6 is a flowchart diagram of an exemplary method for monitoring energy consumption in one or more facilities operating within a computing network in accordance with aspects of the present invention.

FIG. 6 is a flowchart diagram of an exemplary method for monitoring energy consumption in one or more facilities operating within a computing network, in which various aspects of the illustrated embodiments may be implemented. The blocks of functionality 600 may also be incorporated into various hardware and software components of FIGS. 1-4. The functionality 600 may be implemented as a method executed as instructions on a machine, where the instructions are included on at least one computer readable medium or one non-transitory machine-readable storage medium.

The functionality 600 may start in block 602. A data cleaning process may be performed, as in block 604. Energy consumption (of one or more facilities/buildings) may be forecasted to generate one or more residuals, as in block 606. A change point detection operation may be applied to the residuals, as in block 608. The functionality 600 may end in block 610.

Figure 7:
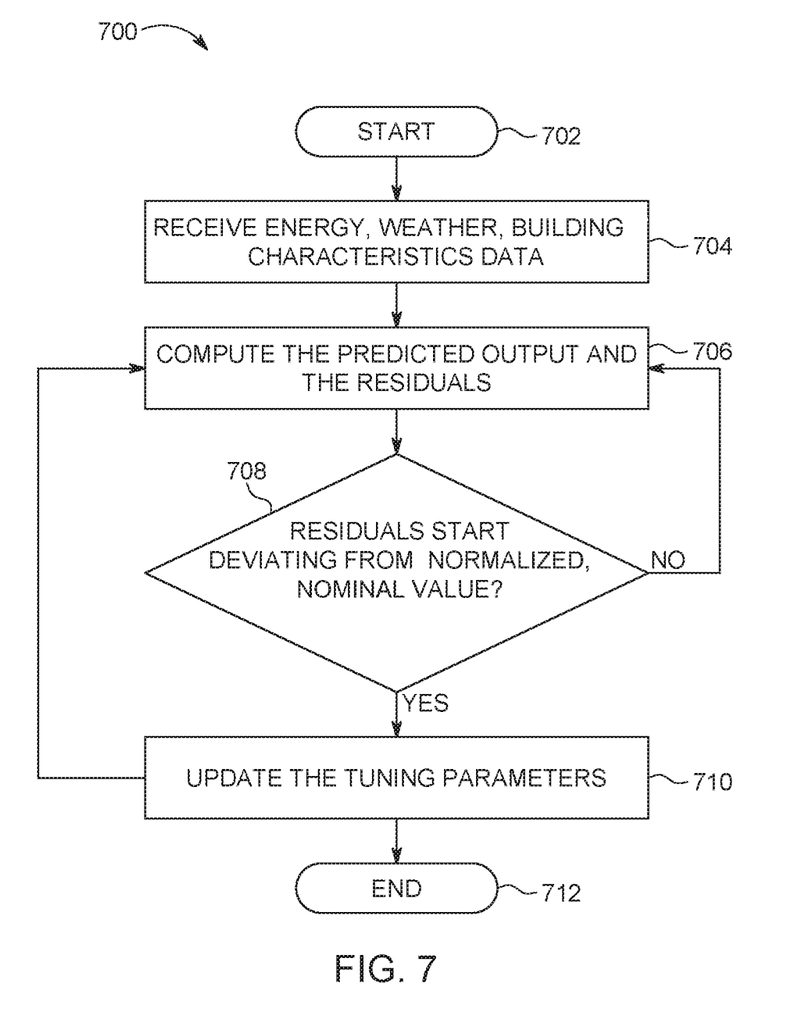
FIG. 7 is a flowchart diagram of an exemplary method for forecasting energy consumption in one or more facilities in an Internet of Things (IoT) computing network in accordance with aspects of the present invention.

FIG. 7 is a flowchart diagram of an exemplary method for forecasting energy consumption in one or more facilities in an IoT computing network, in which various aspects of the illustrated embodiments may be implemented. The blocks of functionality 700 may also be incorporated into various hardware and software components of FIGS. 1-4. The functionality 700 may be implemented as a method executed as instructions on a machine, where the instructions are included on at least one computer readable medium or one non-transitory machine-readable storage medium.

The functionality 700 may start in block 702. Energy data (e.g., energy consumption data), weather data, and building data (e.g., building characteristics and parameters) may be collected and/or received, as in block 704. A predicted output and residuals may be determined and/or computed (e.g., determining the difference between the predicted energy consumption and the actual energy consumption), as in block 706. A determination operation may be performed to determine whether one or more residuals are deviating from a nominalized value for energy consumption, as in block 708. If the one or more residuals are not deviating from a nominalized value for energy consumption, the functionality 700 may return to step 706. If the one or more residuals are deviating from a nominalized value for energy consumption, one or more tuning parameters (e.g., of a prediction model) may be updated (e.g., dynamically changed), as in block 710. The functionality 700 may end in block 712.

In one aspect, the operations for forecasting may include using one or more predictive models (e.g., generalized additive model "GAM", Kernel with adaptive tuning parameters such as, for example, regularization, and the like) to predict energy consumption. The regularization prevents from overfitting (high fluctuation). The kernel with adaptive tuning parameters means that the regularization may be updated upon arrival of new energy consumption data by using, for example, a gradient descent method. During a prediction operation, one or more residuals may be generated. Any difference between the actual energy consumption measurements and the estimated measurements may be compared and determined. That is, as one or more residuals begin to deviate from normalized nominal values (e.g., standardized energy consumption values, a zero value, and/or an energy consumption threshold for a particular or selected facility/building), one or more tuning parameters may be estimated so as to accelerate the convergence and provide fast detection of energy consumption anomalies. That is, when an anomaly occurs, the parameters of the predictive model of the energy consumption change from a normal state to an abnormal state. The transition time between the normal state and the abnormal state, for the change of the predictive model parameters, is variable and may depend on the tuning parameters. "Accelerating the convergence" therefore means reducing that transition time, by making the tuning parameters adaptive, so as to decide quickly (e.g., "fast detection") about the presence of an anomaly. Also, "deviating residuals" means that the actual energy consumption is different from the predicted one by the model, therefore there is a change in the parameters of the model, considered as a reference. This indicates a potential presence of an anomaly.

Figure 8:
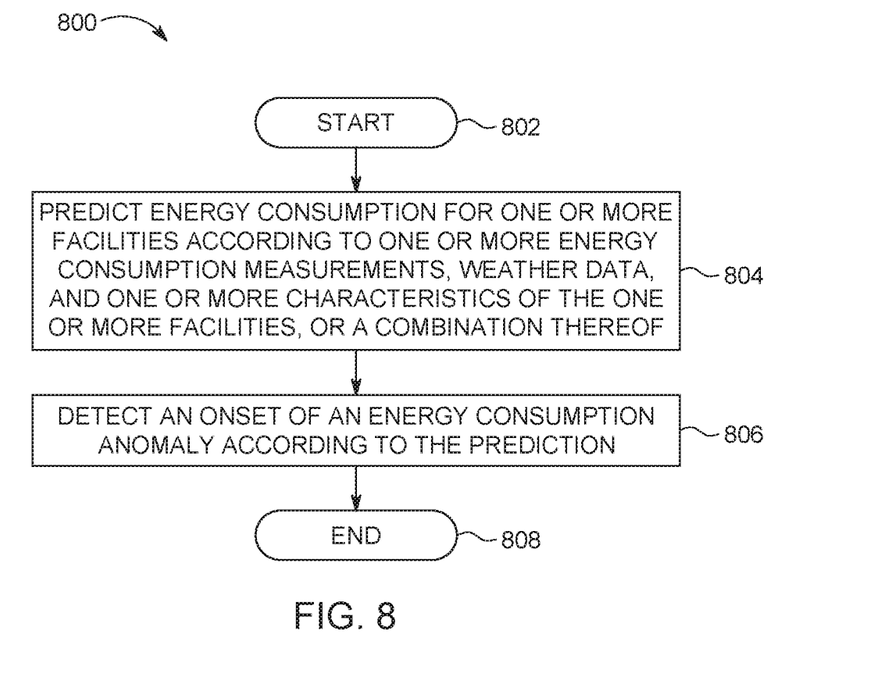
FIG. 8 is a flowchart diagram of an exemplary method for detection of energy consumption anomalies of one or more facilities in an Internet of Things (IoT) computing network in accordance with aspects of the present invention.

FIG. 8 is a method 800 for detection of energy consumption anomalies of one or more facilities (e.g., buildings) in an IoT computing network, in which various aspects of the illustrated embodiments may be implemented. The blocks of functionality 800 may also be incorporated into various hardware and software components of FIGS. 1-4. The functionality 800 may be implemented as a method executed as instructions on a machine, where the instructions are included on at least one computer readable medium or one non-transitory machine-readable storage medium. The functionality 800 may start in block 802. Energy consumption may be predicted for one or more facilities according to one or more energy consumption measurements, weather data, and one or more characteristics of the one or more facilities, or a combination thereof, as in block 804. An onset of an energy consumption anomaly may be detected according to the prediction, as in block 806. The functionality 800 may end in block 808.

In one aspect, in conjunction with and/or as part of at least one block of FIG. 8, the operations of method 800 may include each of the following. The operations of method 800 may predict energy consumption (e.g., power consumption) for one or more buildings based on building parameters, weather conditions, and/or energy consumption measurements and compare the predicted power consumption with a standard power consumption (e.g., a standardized energy consumption amount) for detecting an early/premature onset of abnormal power consumption. The operations of method 800 may activate reading systems (e.g., one or more IoT sensor devices or "smart meters") for capturing power consumption data to identify exact locations for one or more anomalies and then alerting a user. The operations of method 800 may dynamically change tuning parameters of prediction models by considering the building parameters, the weather conditions, energy consumption measurements, or other user defined parameters for predicting the energy consumption levels.

In an additional aspect, the operations of method 800 may alert one or more Internet of Things (IoT) devices of the energy consumption anomaly. The operations of method 800 may identify a location of the energy consumption anomaly according to energy consumption data collected by one or more IoT sensor devices associated with the one or more facilities, monitor the energy consumption using a change point detection operation, a hypothesis test, or a combination thereof. The one or more IoT sensor devices may be in an IoT computing network.

In additional aspects, the operations of method 800 may cognitively learn or estimate one or more tuning parameters of one or more prediction models for predicting the energy consumption, and/or dynamically change one or more tuning parameters of one or more prediction models for predicting the energy consumption. The operations of method 800 may compare the predicted energy consumption with an energy consumption threshold to detect the energy consumption anomaly. A machine learning mechanism may be implemented using the collected feedback information to assist with the learning or estimating one or more tuning parameters of one or more prediction models for predicting the energy consumption. The machine learning mechanism may also be used to predict the energy consumption for one or more buildings (e.g., facilities).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for detection of energy consumption in a computing environment by a processor, comprising:
monitoring, by the processor, data collected by one or more Internet of Things (IoT) sensor devices, wherein the data is representative of a combination of one or more energy consumption measurements, weather data, and one or more characteristics of one or more facilities;
training, using a machine learning operation by the processor, one or more prediction models according to the monitored data, wherein the one or more prediction models compute, in real-time, residuals for the one or more facilities as a difference between a predicted energy consumption and an actual energy consumption of the one or more facilities;
predicting, by the processor, energy consumption for the one or more facilities according to an analyzation of the monitored data by the trained one or more prediction models, wherein, when at least some of the residuals begin to deviate from a standardized nominal value, one or more tuning parameters of the one or more prediction models are dynamically changed; and
detecting, by the processor, an onset of an energy consumption anomaly according to the prediction.

2. The method of claim 1, further including alerting the one or more IoT devices of the energy consumption anomaly.

3. The method of claim 1, further including identifying a location of the energy consumption anomaly according to the monitored data collected by the one or more IoT sensor devices associated with the one or more facilities, wherein the one or more IoT sensor devices are in an IoT computing network.

4. The method of claim 1, further including monitoring the energy consumption using a change point detection operation, a hypothesis test, or a combination thereof.

5. The method of claim 1, further including cognitively learning or estimating the one or more tuning parameters of one or more prediction models for predicting the energy consumption.

6. The method of claim 1, further including comparing the predicted energy consumption with an energy consumption threshold to detect the energy consumption anomaly.

7. A system for detection of energy consumption in a computing environment, comprising:
one or more computers with executable instructions that when executed cause the system to:
monitor, by a processor associated with the one or more computers and executing the executable instructions, data collected by one or more Internet of Things (IoT) sensor devices, wherein the data is representative of a combination of one or more energy consumption measurements, weather data, and one or more characteristics of one or more facilities;
train, using a machine learning operation by the processor, one or more prediction models according to the monitored data, wherein the one or more prediction models compute, in real-time, residuals for the one or more facilities as a difference between a predicted energy consumption and an actual energy consumption of the one or more facilities;
predict, by the processor, energy consumption for the one or more facilities according to an analyzation of the monitored data by the trained one or more prediction models, wherein, when at least some of the residuals begin to deviate from a standardized nominal value, one or more tuning parameters of the one or more prediction models are dynamically changed; and
detect, by the processor, an onset of an energy consumption anomaly according to the prediction.

8. The system of claim 7, wherein the executable instructions further alert the one or more IoT devices of the energy consumption anomaly.

9. The system of claim 7, wherein the executable instructions further identify a location of the energy consumption anomaly according to the monitored data collected by the one or more IoT sensor devices associated with the one or more facilities, wherein the one or more IoT sensor devices are in an IoT computing network.

10. The system of claim 7, wherein the executable instructions further monitor the energy consumption using a change point detection operation, a hypothesis test, or a combination thereof.

11. The system of claim 7, wherein the executable instructions further cognitively learn or estimate the one or more tuning parameters of one or more prediction models for predicting the energy consumption.

12. The system of claim 7, wherein the executable instructions further compare the predicted energy consumption with an energy consumption threshold to detect the energy consumption anomaly.

13. A computer program product for detection of energy consumption in a building associated with a computing environment by a processor, the computer program product comprising a non-transitory computer-readable storage medium having computer-readable program code portions stored therein, the computer-readable program code portions comprising:
an executable portion that monitors, by the processor, data collected by one or more Internet of Things (IoT) sensor devices, wherein the data is representative of a combination of one or more energy consumption measurements, weather data, and one or more characteristics of one or more facilities;
an executable portion that trains, using a machine learning operation by the processor, one or more prediction models according to the monitored data, wherein the one or more prediction models compute, in real-time, residuals for the one or more facilities as a difference between a predicted energy consumption and an actual energy consumption of the one or more facilities;
an executable portion that predicts, by the processor, energy consumption for one or more facilities according to an analyzation of the monitored data by the trained one or more prediction models, wherein, when at least some of the residuals begin to deviate from a standardized nominal value, one or more tuning parameters of the one or more prediction models are dynamically changed; and
an executable portion that detects, by the processor, an onset of an energy consumption anomaly according to the prediction.

14. The computer program product of claim 13, further including an executable portion that alerts the one or more IoT devices of the energy consumption anomaly.

15. The computer program product of claim 13, further including an executable portion that identifies a location of the energy consumption anomaly according to the monitored data collected by the one or more IoT sensor devices associated with the one or more facilities, wherein the one or more IoT sensor devices are in an IoT computing network.

16. The computer program product of claim 13, further including an executable portion that monitors the energy consumption using a change point detection operation, a hypothesis test, or a combination thereof.

17. The computer program product of claim 13, further including an executable portion that
   cognitively learns or estimates the one or more tuning parameters of one or more prediction models for predicting the energy consumption.

18. The computer program product of claim 13, further including an executable portion that compares the predicted energy consumption with an energy consumption threshold to detect the energy consumption anomaly.

\* \* \* \* \*